Nov. 5, 1935.    R. F. DIRKES ET AL    2,019,847
START-STOP TELEGRAPH SYSTEM
Filed April 18, 1934    2 Sheets-Sheet 1
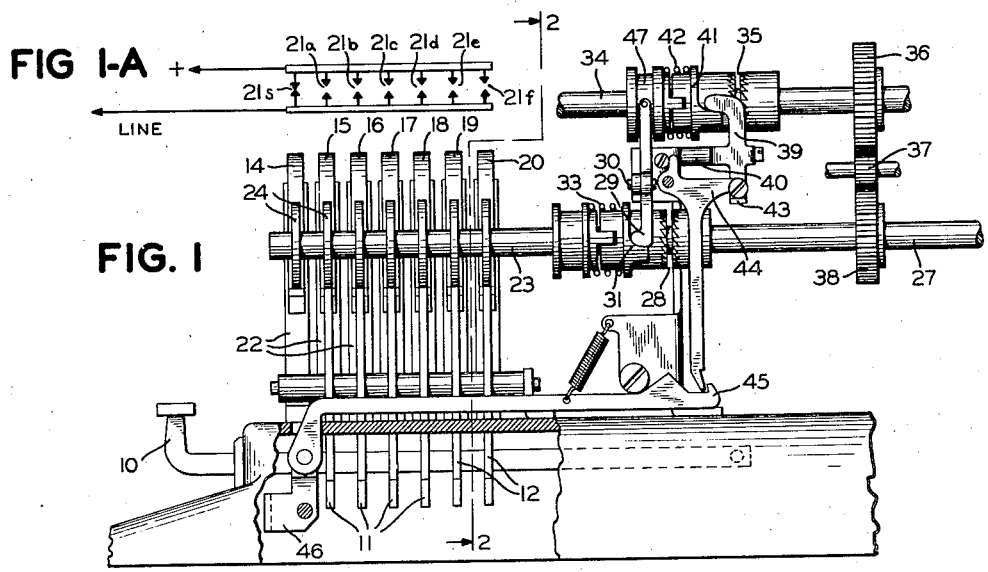
FIG I-A
FIG. 1
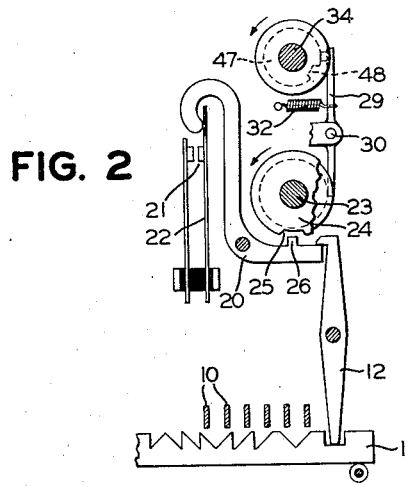
FIG. 2
FIG. 3
INVENTORS
R. F. DIRKES
E. R. WHEELER
BY Eugene C. Brown
ATTORNEY Nov. 5, 1935.  R. F. DIRKES ET AL  2,019,847
START-STOP TELEGRAPH SYSTEM
Filed April 18, 1934     2 Sheets-Sheet 2
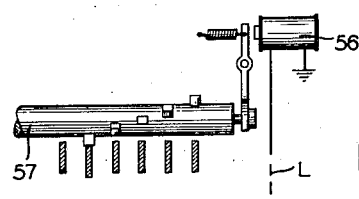
FIG. 4
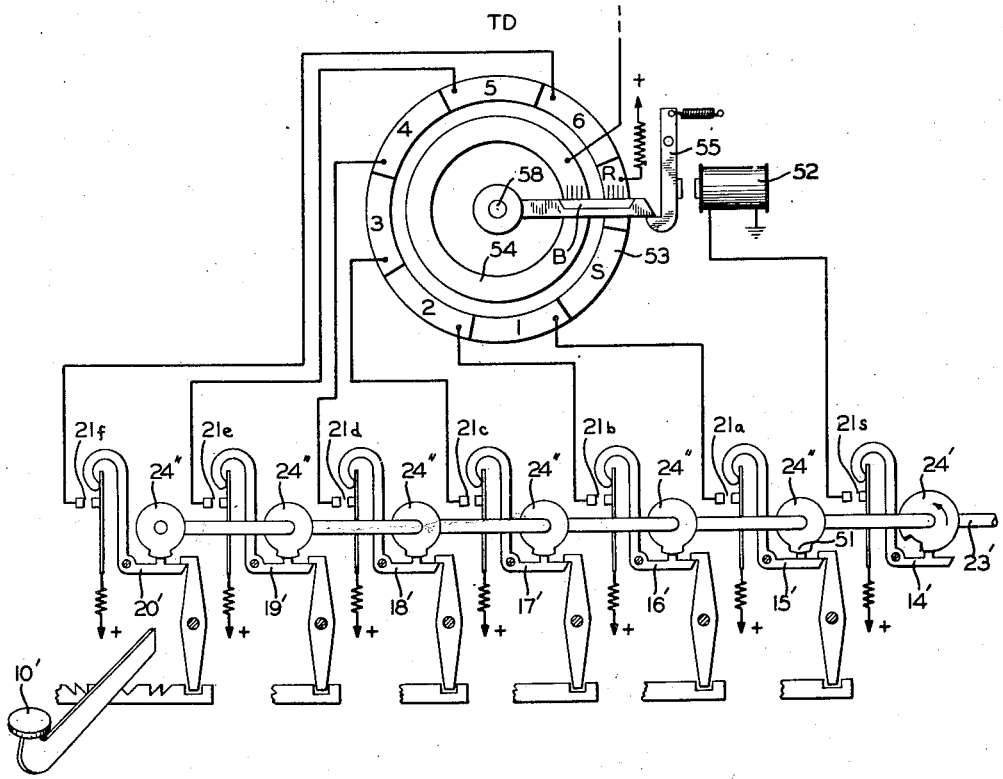
FIG. 5
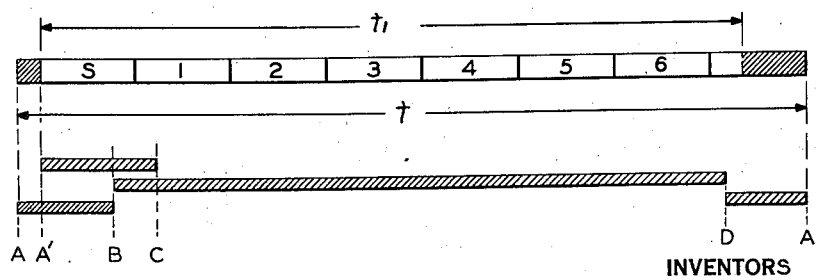
INVENTORS
R. F. DIRKES
E. R. WHEELER
BY
Eugene C. Brown
ATTORNEY Patented Nov. 5, 1935

2,019,847

UNITED STATES PATENT OFFICE 2,019,847

START-STOP TELEGRAPH SYSTEM

Robert F. Dirkes, Jamaica, N. Y., and Evan E. Wheeler, Plainfield, N. J., assignors to The Western Union Telegraph Company, New York, N. Y., a corporation of New York Application April 18, 1934, Serial No. 721,296

10 Claims. (Cl. 178—53.1)

This invention relates to a start-stop system of telegraphy and more particularly to transmitting apparatus for such systems.

The primary object of the invention is to facilitate the maintenance of phase relation between the transmitting apparatus and receiving apparatus.

In start-stop systems of telegraphy the signals consist of a start impulse, a number of code impulses, usually five or six, and a rest impulse. The receiving apparatus is started into operation by the start impulse and comes to rest during the rest impulse. Obviously, if the receiving and transmitting shafts are operating at the same speed, with the transmitting shaft continuously rotating, the receiving shaft will not actually stop between signals, the succeeding start impulse being received to restart the receiving shaft just at the instant it would normally come to rest. However, such exactitude of synchronism between the receiving and transmitting shafts cannot be maintained and should the transmitting shaft have a slightly faster speed, it is obvious that the receiving shaft would not have completed its previous revolution upon receipt of the next start impulse and consequently during the succeeding revolutions the receiving elements would be out of phase with the signals, and the printer would fail to correctly record the transmitted signals.

The specific object of the present invention is to avoid this difficulty and insure that the start impulse of one signal group is not received until the receiving shaft has completed its previous revolution.

This object is accomplished in accordance with our invention by definitely stopping the transmitting shaft after each revolution and holding it at rest for a sufficient period to insure the complete rotation of the receiving shaft, under all normal speed variations likely to occur therebetween.

The invention will be best understood by reference to the accompanying drawings in which:

Fig. 1 is a side elevation of a keyboard transmitter embodying our invention;

Fig. 1A shows diagrammatically, the arrangement of the transmitting contacts;

Fig. 2 is a vertical sectional view substantially on the line 2—2 of Figure 1, with some parts omitted for the sake of clarity;

Fig. 3 is a timing diagram of the transmitting apparatus;

Fig. 4 is a diagrammatic view of a modified embodiment of the invention; and

Fig. 5 is a timing diagram of the transmitter shown in Figure 4.

Referring first to Figures 1 and 2, we have shown a keyboard transmitter comprising a bank of key bars 10, adapted when depressed to engage a group of six notched code bars 11 to shift the same in various combinations to set up, on the contacts of the transmitter, the various signal combinations. Cooperating with the code bars 11 are individual pivoted locking latches 12 adapted to engage over the free ends of corresponding pivoted contact levers. Seven such levers are provided, the foremost lever 14 being the start-stop lever and the remaining six levers 15 to 20 being the code levers. The latches 12 correspond only to the code levers.

The seven contact levers control seven transmitting contacts 21, each of which comprises a vertical spring 22 pressing against the inside of the hooked ends of the contact levers.

Disposed above the horizontal arms of levers 14 to 20 is the transmitting shaft 23 upon which are mounted cams 24, one for each lever. Each cam has a depression 25 therein, arranged so that as the cam shaft rotates the depressions are brought successively into position over a raised portion 26 of each lever. If at this time the levers are unrestrained by latches 12, they are free to rock about their pivots under the action of spring contact arm 22, to thereby close the corresponding contact 21.

The cam shaft 23 is driven from a motor shaft 27 through a clutch 28 normally held disengaged by a stop lever 29 pivoted at 30. The lower end of lever 29 is held in the path of a cam sleeve 31 on the shaft 23, by a spring 32 and by camming action therewith, holds the clutch faces apart against the pressure of spring 33.

Located above the shaft 23 is a timing shaft 34, driven through a start stop clutch 35 and gears 36, 37, and 38, from motor shaft 27. The clutch 35 is normally held disengaged by a stop arm 39 pivoted at 40 and having an inturned end engaging a cam sleeve 41 on the driven element of the clutch, to hold the clutch faces apart against spring 42. The stop arm 39 has a horizontal extension 43 disposed so as to be engaged by a pivoted latch 44, the lower end of which is arranged to be engaged by a trip lever 45, by movement thereof to the left. The lever 45 is secured to the vertical extension of a universal bail 46 extending beneath the key levers 10.

Secured on the timing shaft 34 is a cam 47 having a depression 48 disposed so as to receive a projection on stop lever 29, once each revolution of the timing shaft.

The operation of the mechanism is as follows: Assume the transmitting shaft 23 to have a speed of rotation approximately the same as the shaft of the receiving equipment and shaft 34 to have a somewhat slower speed. For instance shaft 23 may rotate at about 420 R. P. M. and shaft 34 may rotate at about 390 R. P. M. With the transmitter at rest, that is, with clutches 28 and 35 disengaged, the cam shaft 23 will be in position to cause the start-stop contacts 21s (Fig. 1A) to be closed and a marking or rest condition will be sent over the line, thereby maintaining the receiving apparatus at rest.

Upon depression of a key 10, the locking latches 12 are positioned to set up a code combination on contacts 15 to 20. At the same time the universal bail 46 is rocked to draw trip lever 45 to the left, thereby rocking latch 44 to engage stop arm 39 and move its upper inturned end radially away from the cam sleeve 41. Clutch 35 is thereupon engaged causing timing shaft 34 to make a single revolution, the shaft being stopped at the end of the revolution by re-engagement of stop arm 39 with cam sleeve 41. After cam 47 has rotated a short distance the depression 48 comes opposite lever 29 and permits the same to be rocked by spring 32 out of engagement with cam sleeve 31, permitting clutch 28 to engage and starting shaft 23 into rotation.

As shaft 23 starts to rotate, the start-stop contact 21s is first opened to send a spacing or start condition to line, after which code contacts 21a to 21f (Fig. 1A) are closed in succession, unless held open by latches 12, to send the code combination to line. Shaft 23 comes to rest with the start-stop contact 21s again closed to apply a rest condition to the line. The starting of shaft 23 is so delayed relative to the starting of timing shaft 34 and the relative speeds of the two shafts, that both complete their revolution at substantially the same instant. However, since shaft 23 does not start again until shaft 34 has rotated over a sufficient portion of the next revolution to bring cam depression 48 again opposite stop lever 29, there will always be a lag in the starting of the transmitting cam shaft. In the example assumed the shaft 23 is at rest approximately 8 percent of each cycle. This has been found sufficient in practice to insure that the receiving cam will have come to rest before the next transmitting cycle is started. The usual keyboard interlock (not shown) may be provided to guard against depression of another key before the combination has been completely transmitted.

The timing of the transmitter will be clear from an inspection of Figure 3. In this figure (t) represents the time required for the timing shaft 34 to make one revolution. A short time, (t') after shaft 34 starts, shaft 23 is released, transmitting a start impulse S, six code impulses 1 to 6 and a rest impulse R during the period t₁, which is equal to (t—t'). The time (t') represents the period of rest of the transmitting shaft.

Reference will now be had to Figure 4 for a description of a modified embodiment of the invention. In this form of the invention, the start-stop cam 24' is placed on the cam shaft 23' so that the depression therein is offset slightly to one side of the hump of the corresponding lever 14', when the shaft is at rest, thereby normally retaining the start-stop contact 21s, open. The remaining cams 24", in place of having depressions therein, have a single raised portion 51, the raised portion of each cam being in engagement with the corresponding contact levers 15' to 19' in the rest portion of shaft 23' to hold the code contacts 21a to 21f open.

The start-stop contact is connected through the start magnet 52 of a rotary transmitting distributor TD and the code contacts 21a to 21f are connected to segments 1 to 6 of the segmented ring 53 of said distributor. This ring also has a rest segment R connected to battery and a start segment S free from applied potential. The solid ring 54 is connected to the outgoing line L.

The brush arm B of the distributor is normally held at rest on segment R by a latch 55.

The line L terminates in the selecting magnet 56 of any desired type of receiver, having a receiving shaft 57, adapted to be driven at the same speed as the brush arm shaft 58, say 420 R. P. M. Shaft 23' is driven at a somewhat lower speed, say 390 R. P. M.

The operation is as follows: With shaft 23' at rest, the start-stop contact controlled by lever 14' is open and brush B is at rest on segment R, with a rest condition applied to line L thereby holding shaft 56 of the receiving printer at rest. When a key 10' is depressed to set up a selection in levers 15' to 20', shaft 23' is released for rotation by the universal bail in the usual manner. Immediately thereafter the drop of cam 24' comes opposite lever 14' causing the associated contact to close, thereby energizing magnet 52 to release brush B for a revolution. At the same time cams 24" rotate to release simultaneously the levers 15' to 20' and set up the selective signal on the segments of the face plate. As brush B rotates on to segment S, a start signal goes over the line releasing the receiving shaft 57, which then rotates in phase with the brush B. Brush B rotates faster than shaft 23' and completes its revolution somewhat ahead thereof, coming to rest at the same time as receiving shaft 57. Brush B cannot be restarted for another revolution, however, until shaft 23' has completed its revolution and been released for its next revolution, thereby insuring the transmitting brush arm shaft remaining at rest a predetermined minimum period between each character transmitted.

In the timing diagram shown in Figure 5, (t) represents the time of revolution of cam shaft 23' and t₁ the time of revolution of the brush arm shaft 58. Almost immediately upon release of shaft 23', the start-stop contact closes releasing the brush arm shaft 58. Shafts 23' and 58 therefore start into rotation in close succession, as indicated at points of time A and A' in Figure 5. The start-stop contacts remain closed until point C is reached. The code contacts controlled by levers 15' to 20' close at point B remaining closed until point D is reached, at which time all the code 21a to 21f contacts open and remain open until point B is again reached, during the succeeding revolution.

It will be noted, therefore, in each embodiment shown, that the transmitting shaft is designed to rotate at the same speed as the receiving shaft, but is held at rest for at least a predetermined minimum period between each revolution, the duration of which depends upon the difference in speed of the transmitting shaft and the slower speed timing shaft 34 in Figure 1 or the cam shaft 23' in Figure 4. This idle period of the transmitting shaft insures the receiving shaft coming to rest before the succeeding group of signals is begun.

Obviously variations of these embodiments will occur to those skilled in this art and, therefore, we do not desire to be limited to the particular details shown and described.

What we claim is:

1. In a start-stop telegraph system, a transmitting cam shaft operable at a predetermined speed, a second shaft operable at a predetermined slower speed, means controlled by said first shaft for transmitting start-stop telegraph signals and means controlled by said second shaft on each revolution thereof for releasing said first shaft for a single revolution.

2. In a start-stop telegraph system, a transmitting shaft operable at a predetermined speed, a second shaft operable at a predetermined slower speed, a keyboard mechanism for setting up code combinations, means for releasing said second shaft for a single revolution on each actuation of said keyboard mechanism and means controlled by said second shaft on each revolution thereof for releasing said first shaft for a single revolution whereby to transmit the code combination set up by said keyboard mechanism.

3. In a start-stop telegraph transmitter, a driving member, a transmitting shaft driven thereby, a timing shaft driven by said driving member at a slower rate than said transmitting shaft, single revolution clutches for each of said shafts, permutation means for setting up code combinations for transmission, means for releasing said timing shaft for a revolution for each code combination set up, said timing shaft during said revolution releasing the transmitting shaft for a single revolution to transmit the code combination set up by said permutation means.

4. In a start-stop telegraph transmitter, a pair of elements each movable through a predetermined cycle for each character code combination transmitted, said elements completing their cycles in different intervals of time, means for transmitting start, code and rest impulses over a period of time substantially equal to the length of the cycle of longest duration, said start and code impulses being transmitted over a period substantially equal in length to the length of the cycle of shortest duration.

5. In a start-stop telegraph transmitter, a pair of elements each movable through a predetermined cycle for each character code combination transmitted, one of said elements controlling the period of transmission of the start and code impulses and the other element controlling the period of transmission of the rest impulse.

6. In a start-stop telegraph transmitter, a pair of elements each movable through a predetermined cycle for each character code combination transmitted, means for starting said elements in movement at substantially the same time and for stopping each element at a different time, means for transmitting start and code impulses during the time of simultaneous movement of both elements and means for transmitting a rest impulse during the differential in the time of stopping in each element.

7. In a start-stop telegraph transmitter, a pair of elements each movable through a predetermined cycle for each character code combination transmitted, said elements both moving through at least a part of their cycles during a common time interval, one of said elements being movable through another part of its cycle during a separate time interval, means for transmitting start and code impulses during said common time interval and means for transmitting a rest condition during said separate time interval.

8. In a start-stop telegraph transmitter, a pair of elements each movable through a predetermined cycle for each character code combination transmitted, means for starting said elements into movement in succession and means for transmitting a rest condition during the interval between the starting of one element and the starting of the other element.

9. In a start-stop telegraph system, a plurality of contacts comprising a code contact for each element of the code and a rest contact, a transmitting cam shaft operable at a predetermined speed, a receiving instrument having a selecting cam shaft operable at substantially the same speed as said transmitting shaft, said transmitting shaft when at rest actuating said rest contact to transmit a rest condition to said receiving instrument and when in rotation to actuate said code contacts in succession to transmit a series of code impulses to said receiving instrument and means for retaining said transmitting cam shaft at rest for at least a predetermined period between each revolution thereof whereby a rest impulse of at least a predetermined duration will be invariably transmitted.

10. In a start-stop telegraph transmitter, a rotary distributor having individual contacts for each element of the code and a rest contact, a keyboard mechanism operable to set up code combinations on said distributor, a motor driven shaft released upon each operation of said keyboard mechanism for predetermined rotation, said shaft serving to release said rotary distributor to transmit the code combination set up by said keyboard mechanism and to maintain the same at rest for at least a predetermined period between the transmission of each character code combination.

ROBERT F. DIRKES.
EVAN R. WHEELER.